US005564452A

United States Patent [19]
Kitchen

[11] Patent Number: 5,564,452
[45] Date of Patent: Oct. 15, 1996

[54] GRILL CANOPY

[76] Inventor: Robert Kitchen, 115 Province Street, South, Hamilton, Ontario, Canada, L8K 2L2

[21] Appl. No.: 507,539

[22] Filed: Jul. 26, 1995

[51] Int. Cl.⁶ .................................................. E04H 15/02
[52] U.S. Cl. ............................ 135/96; 135/161; 160/76
[58] Field of Search ........................... 135/96, 88.04, 135/88.08, 88.11, 156, 160, 161; 52/74, 630, 783.14, 783.15, 798.1; 160/46, 76, 61, 83.1

[56] References Cited

U.S. PATENT DOCUMENTS

| | | | |
|---|---|---|---|
| 596,477 | 1/1898 | Cammack | 160/46 |
| 1,618,184 | 2/1927 | Gist | 160/83.1 X |
| 2,805,711 | 9/1957 | Mehl | 160/76 |
| 3,233,618 | 2/1966 | Ferrier | 135/96 X |
| 3,234,697 | 2/1966 | Toti et al. | 52/798.1 X |
| 3,303,851 | 2/1967 | Grunfeld | 135/96 X |
| 4,519,409 | 5/1985 | Kinney et al. | 135/880.8 |
| 5,000,210 | 3/1991 | Worthington, Jr. | 135/96 X |
| 5,022,420 | 6/1991 | Brim | 135/161 X |
| 5,215,108 | 6/1993 | Sprague | 135/96 X |
| 5,441,067 | 8/1995 | James et al. | 135/96 |

*Primary Examiner*—Lanna Mai

[57] ABSTRACT

A canopy for protecting an individual from adverse weather when positioned in front of a grill. The inventive device includes an inclined canopy and support assemblies for securing the canopy above and in front of a grill.

3 Claims, 3 Drawing Sheets

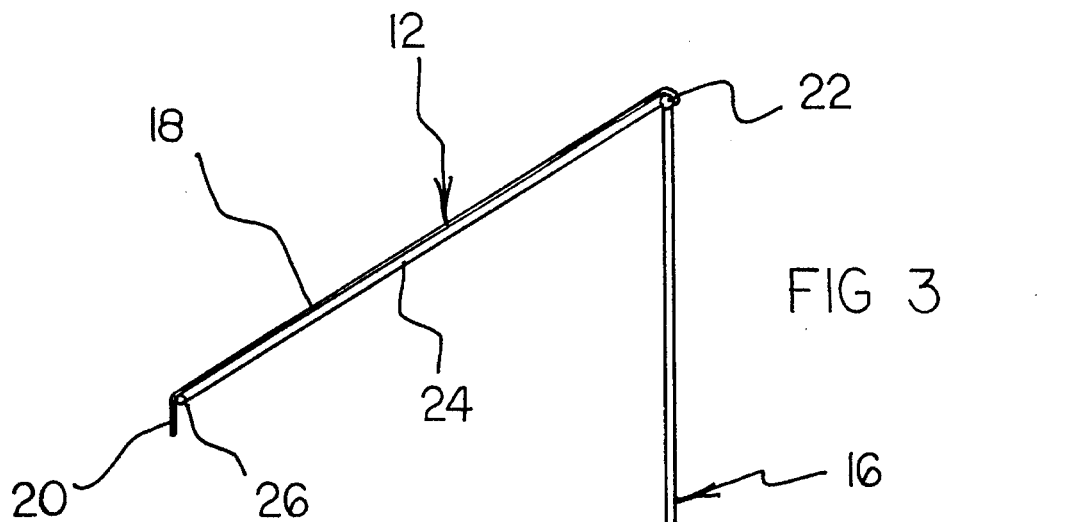
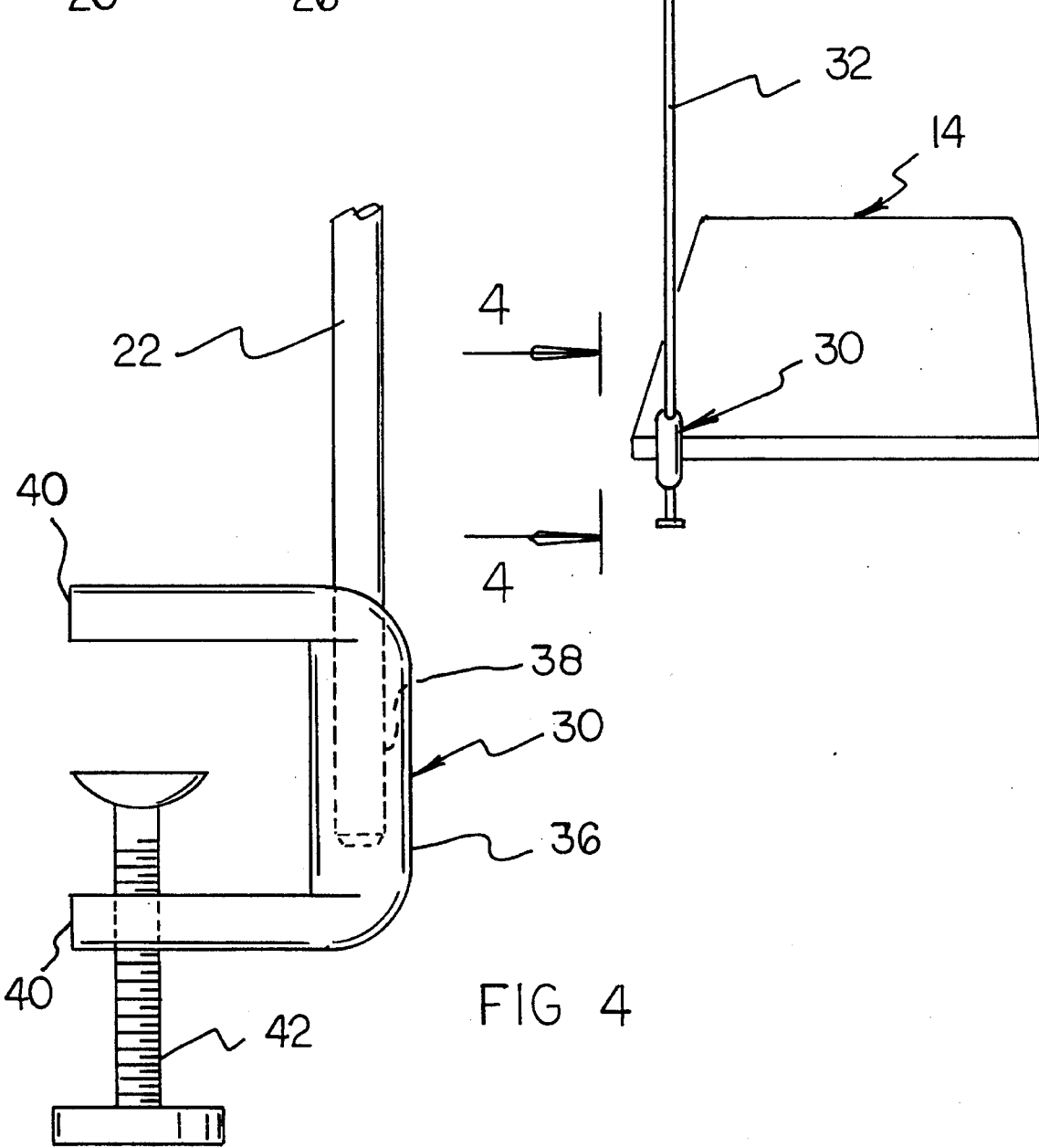

GRILL CANOPY

BACKGROUND OF THE INVENTION

1. Field of the Invention

The present invention relates to portable canopy structures and more particularly pertains to a grill canopy for protecting an individual from adverse weather when positioned in front of a grill.

2. Description of the Prior Art

The use of portable canopy structures is known in the prior art. More specifically, portable canopy structures heretofore devised and utilized are known to consist basically of familiar, expected and obvious structural configurations, notwithstanding the myriad of designs encompassed by the crowded prior an which have been developed for the fulfillment of countless objectives and requirements.

Known prior an portable canopy structures include U.S. Pat. Nos. 4,540,010; 4,469,114; 5,320,405; 5,203,363; 5,277,213; and Des. 279,833.

While these devices fulfill their respective, particular objectives and requirements, the aforementioned patents do not disclose a grill canopy for protecting an individual from adverse weather when positioned in front of a grill which includes an inclined canopy, and support assemblies for securing the canopy above and in front of a grill.

In these respects, the grill canopy according to the present invention substantially departs from the conventional concepts and designs of the prior art, and in so doing provides an apparatus primarily developed for the purpose of protecting an individual from adverse weather when positioned in front of a grill during a cooking procedure or the like.

SUMMARY OF THE INVENTION

In view of the foregoing disadvantages inherent in the known types of portable canopy structures now present in the prior art, the present invention provides a new grill canopy construction wherein the same can be utilized for protecting an individual from adverse weather relative to a grill. As such, the general purpose of the present invention, which will be described subsequently in greater detail, is to provide a new grill canopy apparatus and method which has many of the advantages of the portable canopy structures mentioned heretofore and many novel features that result in a grill canopy which is not anticipated, rendered obvious, suggested, or even implied by any of the prior art portable canopy structures, either alone or in any combination thereof.

To attain this, the present invention generally comprises a canopy for protecting an individual from adverse weather when positioned in front of a grill. The inventive device includes an inclined canopy and support assemblies for securing the canopy above and in front of a grill.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new grill canopy apparatus and method which has many of the advantages of the portable canopy structures mentioned heretofore and many novel features that result in a grill canopy which is not anticipated, rendered obvious, suggested, or even implied by any of the prior art tool guides, either alone or in any combination thereof.

It is another object of the present invention to provide a new grill canopy which may be easily and efficiently manufactured and marketed.

It is a further object of the present invention to provide a new grill canopy which is of a durable and reliable construction.

An even further object of the present invention is to provide a new grill canopy which is susceptible of a low cost of manufacture with regard to both materials and labor, and which accordingly is then susceptible of low prices of sale, thereby making such grill canopies economically available to the buying public.

Still yet another object of the present invention is to provide a new grill canopy which provides in the apparatuses and methods of the prior an some of the advantages thereof, while simultaneously overcoming some of the disadvantages normally associated therewith.

Still another object of the present invention is to provide a new grill canopy for protecting an individual from adverse weather when positioned in front of a grill.

Yet another object of the present invention is to provide a new grill canopy which includes an inclined canopy, and support assemblies for securing the canopy above and in front of a grill.

These together with other objects of the invention, along with the various features of novelty which characterize the invention, are pointed out with particularity in the claims annexed to and forming a pan of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an elevation view thereof.

FIG. 4 is an enlarged elevation view taken from line 4—4 of FIG. 3.

DESCRIPTION OF THE PREFERRED EMBODIMENT

Figure 1:
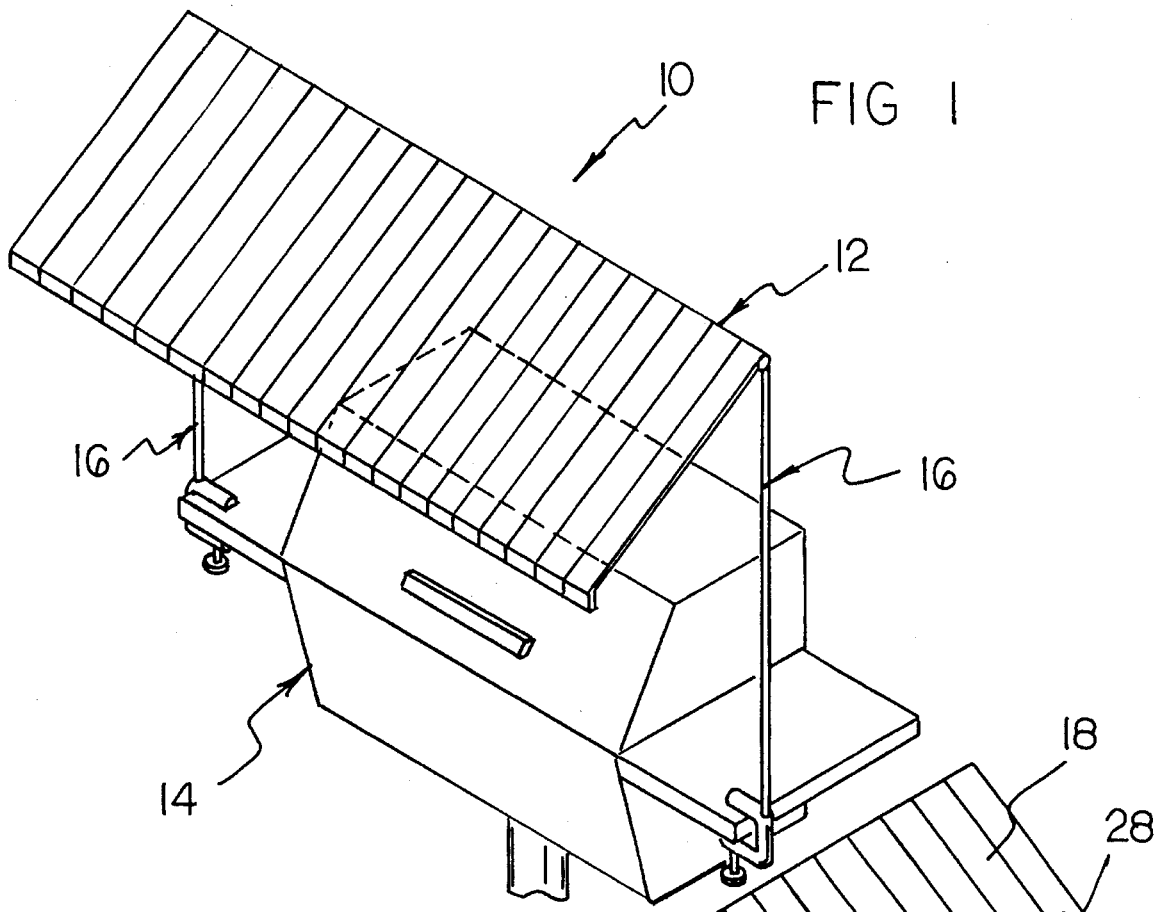
FIG. 1 is an isometric illustration of a grill canopy according to the present invention in use.
Figure 2:
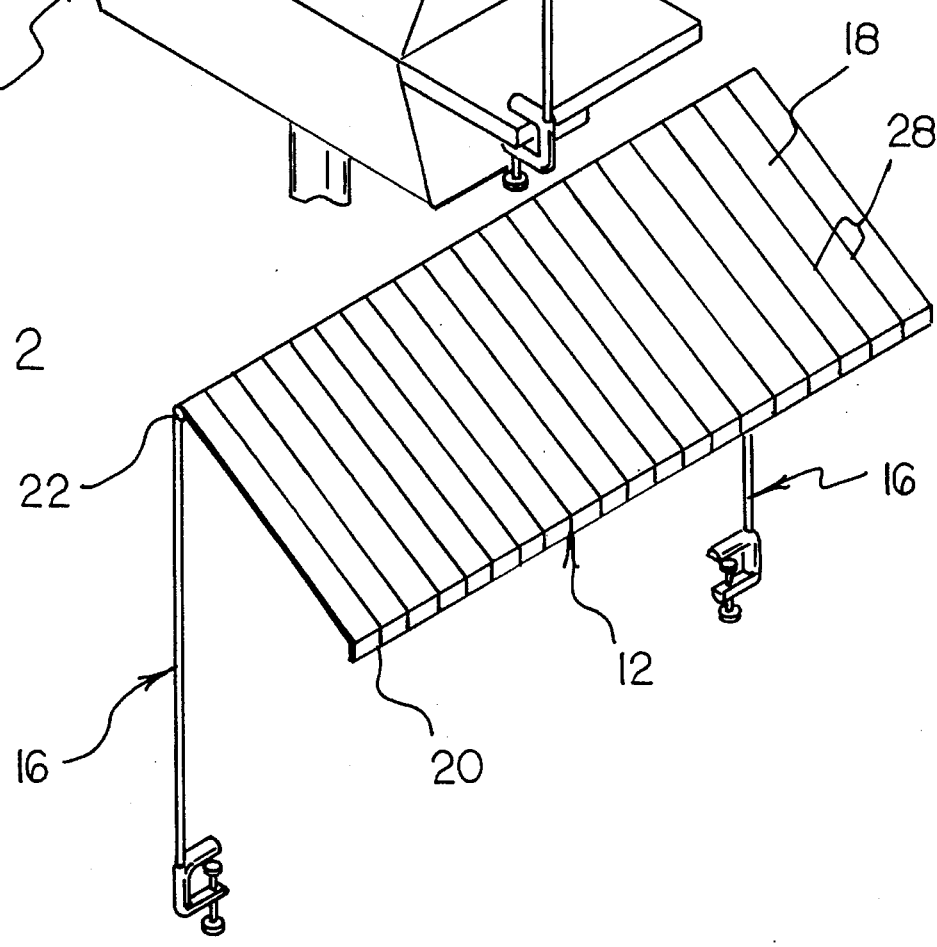
FIG. 2 is an isometric illustration of the invention, per se.

With reference now to the drawings, and in particular to FIGS. 1–5 thereof, a new grill canopy embodying the principles and concepts of the present invention and generally designated by the reference numeral 10 will be described.

More specifically, it will be noted that the grill canopy 10 comprises a canopy member 12 positionable above and in front of a grill 14 such as is shown in FIG. 1 of the drawings. Support means 16 extend from the canopy member 12 and can be removably coupled to the grill 14 for supporting the canopy member above and slightly in front of the grill 14. By this structure, an individual residing in front of the grill 14 can manipulate or cook food items thereon during adverse weather conditions, whereby the canopy member 12 directs rain or like precipitation away from the individual.

Figure 5:
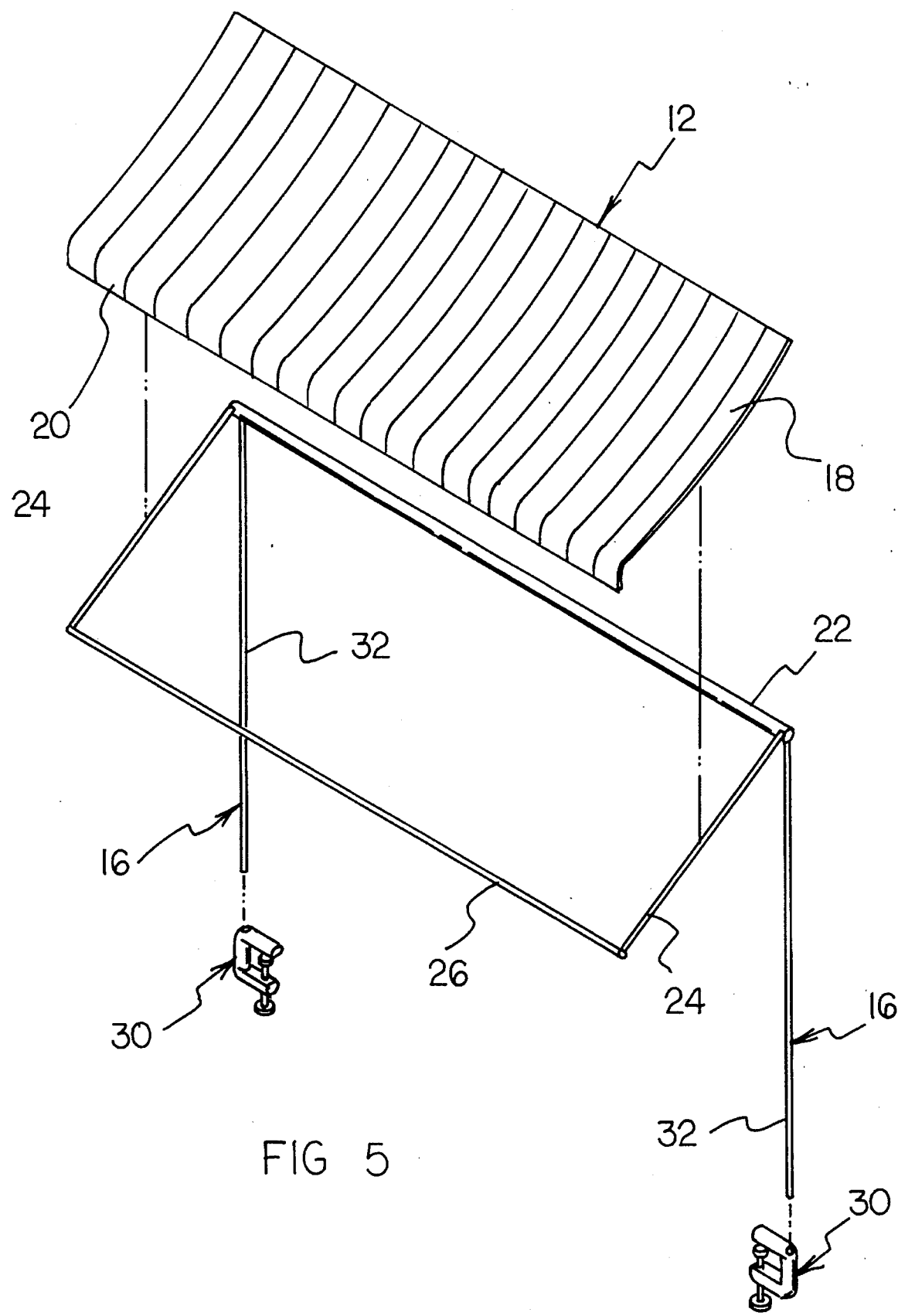
FIG. 5 is an exploded isometric illustration of the present invention.

Referring now to FIGS. 2 through 5 wherein the present invention 10 is illustrated in detail, it can be shown that the canopy member 12 of the present invention 10 preferably comprises a main panel 18 having an upper longitudinal edge spaced from a lower longitudinal edge. A drip-edge panel 20 can extend from the lower longitudinal edge of the main panel 18 and may take the form of a gutter or like fluid directing conduit. As best illustrated in FIGS. 3 and 5, it can be shown that an upper longitudinal support rod 22 is coupled to and extends along the upper longitudinal edge of the main panel 18. At least one transverse support rod 24 extends from the upper longitudinal support rod 22 transversely across an interior surface of the main panel 18. A lower longitudinal support rod 26 is coupled to the at least one transverse support rod 24 and extends along the lower longitudinal edge of the main panel 18 at a juncture of the drip-edge panel 20 with the main panel. As shown in FIG. 5, the at least one transverse support rod 24 preferably comprises a pair of spaced and substantially parallel transverse support rods extending substantially orthogonally from opposed ends of the upper longitudinal support rod 22 and coupling in a substantially orthogonal orientation with opposed ends of the lower longitudinal support rod 26 so as to define a substantially rectangular shape of the canopy member 12. The main panel 18 and the drip-edge panel 20 of the canopy member 12 can be formed of any desired material such as flexible canvas, water impervious fabric, or the like which is secured to the upper longitudinal support rod 22, the transverse support rods 24, and the lower longitudinal support rods 26 by snaps, buttons, wire ties, stitching, or like fastening means. Preferably, the main panel 18 is formed of a sheet metal material having a plurality of transverse grooves 28 directed transversely thereacross which operate to guide impinging precipitation in a transverse direction along the main panel 18.

With continuing reference to FIGS. 2 through 6, it can be shown that the support means 16 of the present invention 10 preferably comprises a pair of C-clamps 30 which can be secured to portions of the grill 14, such as the laterally projecting shelf members extending from the grill as shown in FIG. 1 of the drawings. A vertical support rod 32 is rotatably mounted to each of the C-clamps 30 and extends upwardly therefrom. The vertical support rod 32 is fixedly secured to an end of the upper longitudinal support rod 22 and is preferably oriented at an acute included angle relative to the transverse support rods 24. By this structure, the canopy member 12 is supported in an inclined orientation relative to the vertical positioning of the vertical support rods 32 such that precipitation or the like is directed along the main panel 18 and over the drip-edge panel 20 of the canopy member 12.

As shown in FIG. 4, each of the C-clamps 30 preferably comprises an elongated center body 36 having a cylindrical receiving bore 38 directed thereinto within which the vertical support rod 22 is rotatably positioned. A pair of substantially spaced and parallel clamp legs 40 extend from opposed upper and lower ends of the center body 36 for receiving a portion of the grill 14 therebetween as shown in FIG. 1 of the drawings. A securing fastener 42 is threadably directed through an individual one of the clamp legs 40 and can be rotatably axially advanced towards another one of the clamp legs 40 so as to capture the portion of the grill 14 therebetween to secure the C-clamp 30 relative to the grill. By this structure, the support means 16 can be easily coupled to portions of a grill 14, or portions of another supporting surface such as a picnic table or the like.

In use, the grill canopy 10 of the present invention can be easily utilized for protecting an individual from adverse weather when positioned in front of a grill 14 when the device 10 is in use as shown in FIG. 1 of the drawings. The present invention 10 can be easily transported and subsequently coupled to a grill 14 as desired by an end user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A grill canopy comprising:
   a grill;
   a canopy member positioned above and in front of the grill; said canopy member comprises:
   a main panel having an upper longitudinal edge spaced from a lower longitudinal edge;
   a drip-edge panel extending from the lower longitudinal edge of the main panel;

an upper longitudinal support rod coupled to and extending along the upper longitudinal edge of the main panel;

a lower longitudinal support rod coupled to the transverse support rod and extending along the lower longitudinal edge of the main panel at a juncture of the drip-edge panel with the main panel;

a pair of spaced and parallel transverse support rods extending from the upper longitudinal support rod transversely across an interior surface of the main panel; said transverse support rods extending substantially orthogonally from opposed ends of the upper longitudinal support rod and coupling in a substantially orthogonal orientation with opposed ends of the lower longitudinal support rod;

wherein the main panel and the drip-edge panel of the canopy member are integrally formed of a sheet metal material having a plurality of transverse grooves directed transversely thereacross to guide impinging precipitation in a transverse direction along the main panel;

support means extending from the canopy member and being coupled to the grill to removably support the canopy member above and slightly in front of the grill; said support means comprises:

a pair of C-clamps secured to portions of the grill, a pair of vertical support rods each being rotatably mounted to an individual one of the C-clamps and extending upwardly therefrom; the vertical support rods being fixedly secured to an end of the upper longitudinal support rod and oriented so as to extend therefrom at an acute angle relative to the transverse support rods such that the canopy member is supported in an inclined orientation relative to the vertical positioning of the vertical support rods to cause precipitation to flow along the main panel and over the drip-edge panel of the canopy member.

2. The grill canopy of claim 1, wherein each of the C-clamps comprises an elongated center body having a cylindrical receiving bore directed thereinto within which the respective vertical support rod is rotatably positioned; a pair of substantially spaced and parallel clamp legs extending from opposed upper and lower ends of the center body for receiving a portion of the grill therebetween; and a securing fastener threadably directed through an individual one of the clamp legs and rotatably axially advanced towards another one of the clamp legs to capture the portion of the grill therebetween to secure the C-clamp relative to the grill.

3. The grill canopy of claim 2, wherein the grill includes a pair of laterally projecting shelf members extending from the grill, and further wherein the C-clamps are each secured to an individual one of the laterally projecting shelf members.

* * * * *